Patented Sept. 13, 1938

2,130,070

UNITED STATES PATENT OFFICE 2,130,070

LIGHT SENSITIVE PAPER AND METHOD OF TREATING SAME

Clyde A. Crowley and George H. Goodyear, Chicago, Ill., assignors to The Huey Company, Chicago, Ill., a corporation of Illinois No Drawing. Application November 5, 1937, Serial No. 172,923

3 Claims. (Cl. 95—6)

Our invention relates to light-sensitive paper and to a predeveloper therefor, and particularly relative to a novel coating for blue print paper and to a chemical compound adapted for use in the treatment thereof. This application is a continuation in part of our application, Serial No. 139,950, filed April 30, 1937, of which one division, U. S. Patent No. 2,113,423 has been granted.

A predeveloper of the type intended for use in the described relation is disclosed in our U. S. Patent No. 2,093,421 granted September 21, 1937.

One of the principal problems in the manufacture of blue print paper is that of providing a coating therefor having a known stability or permanency under adverse climatic conditions; in other words, a paper that the manufacturer may distribute with the assurance that it will remain effective for at least a known period, preferably over one year. The desire, and in many cases the necessity for a certain degree of permanency has been responsible for the general use of a coating compound that is relatively slow in action and which does not produce bright or intense blue color without bleeding and the resultant partial obliteration of the white lines. An object of our invention is, therefore, to provide a perfectly stable coating, one that operates to completely eliminate bleeding in development and one in which an intense blue is present in the final product, and a paper which prints at greater speed than products heretofore known.

The improvement is brought about by the use of a novel coating containing some of the usual components, but in which a substance that acts as a catalyzer to accomplish the needed results, is incorporated. The catalytic agents which we have discovered are the salts of aliphatic nitrogen bases. The aliphatic nitrogen base itself is the effective agent, but it cannot be added directly to the sensitizing solution because of the increase in pH resulting in decreased stability, due to possible ferric hydroxide formation and in decreased sensitivity. Therefore, an equivalent amount of acid must be added in some manner to the sensitizing solution. This acid may be inert as far as the reactions occurring during exposure and development of the sensitized paper are concerned, or the acid radicle may itself have some beneficial effect as disclosed in the copending application for Patent No. 2,113,423 dated April 5, 1938, in which the effectiveness of nitrates is disclosed.

The benefits resulting from the inclusion of the salts of aliphatic nitrogen bases in the sensitizing solution may be due to the following or additional factors:

1. The aliphatic nitrogen base salts have absorption spectra in certain wave lengths of light which are not absorbed by ordinary sensitizers. Only absorbed light is effective in exposure.

2. Experiment has shown a steady increase in the pH of washings from an exposed sensitized paper as the length of exposure increases. In the presence of weekly basic aliphatic amine base salts, this increase in pH is less. Therefore, the paper remains sensitive to light for a longer period during exposure and also the blue color of the final print is superior.

We wish to specifically exclude hexamethylene tetramine from the discussion as it is a condensation product having the property peculiar to itself of forming insoluble precipitates with ferri-cyanides and alkaline earth metals as disclosed in Harper's patent, (British) No. 427,746.

Although the quantitative distinction between the individual aliphatic nitrogen bases which have been tested is of small magnitude, there is none the less, practical reason for choice among this group. Among the most effective aliphatic nitrogen base salts are the ethanolamine salts, the amylamine salts, and the ethylene diamine salts. Because of their hydroscopic properties, the ethanolamine (mono, di, and triethanolamine) salts have been found less advantageous than the amylamine salts and ethylene diamine salts. The only objection to the use of amylamine salts is the persistence of their odor and the resultant commercial disadvantage which might be accrued therefrom. Ethylene diamine salts in particular, lacking the disadvantages of the other two of this group, has been found both effective and not subject to technical criticism on any score. Other salts of aliphatic nitrogen bases which have been investigated are equally effective.

Although the above catalysts may be added to the known types of blue print sensitizing solutions with beneficial results, in practice we prefer to formulate sensitizing solutions particularly adapted to take advantage of the catalytic reaction induced by these substances.

1. Ammonium oxalate_____ 10 oz.
2. Ethylene diamine nitrate_____ 7 oz.
3. Ferric ammonium oxalate_____ 8 lbs. 8 oz.
4. Potassium ferricyanide_____ 5 oz.
5. Water, to bring the solution to_____ 14° Bé'.

This formula makes approximately five (5) gallons.

A paper sensitized with the above solution will not produce good prints when developed in the ordinary manner, due to their low potassium ferricyanide content. If a special predeveloper of the type described in our U. S. Patent No. 2,093,421, and hereinafter described, is not used, the color is not sufficiently deep.

However, when a paper coated with the above type of sensitizer is treated with this special type of predeveloper, an exceptionally fine print will result. For example, the so-coated sheet should be developed in a solution such as the following and then be washed and treated with an oxidizing solution and rinsed.

1. Potassium carbonate _____ 10 oz.
2. Oxalic acid _____ 2.5 oz.
3. Disodium phosphate ($Na_2HPO_4.12H_2O$) 22 oz.
4. Glucose _____ 5.5 oz.
5. Potassium ferrocyanide _____ 7 lbs.
6. Sodium bisulphite _____ 13.5 oz.
7. Water, to make _____ 5 gals.

A number of other satisfactory predeveloper solutions are disclosed in our said U. S. Patent No. 2,093,421. Another satisfactory solution is as follows:

1. Potassium carbonate _____ 11 oz.
2. Oxalic acid _____ 9.5 oz.
3. Disodium phosphate ($Na_2HPO_4.12H_2O$) 24 oz.
4. Sucrose _____ 8 oz.
5. Potassium ferrocyanide _____ 8 lbs.
6. Sodium bisulphite _____ 12 oz.
7. Water, to make _____ 5 gals.

When the exposed paper is washed in a solution such as above defined, the excess of ferrous iron in the exposed portions reacts with the ferrocyanide of the predeveloping solution to form ferroferrocyanide. The concentration of the ferrocyanide ion in the developer is great enough so that no ferrous iron has the opportunity to wash or bleed due to the insolubility of ferrous ferrocyanide.

The exposed paper is then given the customary water wash, bichromate wash and water rinse.

When in use, this predeveloper gives better results if the oxidation of the ferrocyanide is inhibited by the presence of a reducing agent, but this reducing agent must not be strong enough to reduce the iron in the ferric complex on the paper. In pactice, sodium bisulphite has been found satisfactory.

A further improvement in the brilliance of the print is achieved by decreasing the particle size of the pigment on the paper. This is done by means of aliphatic polyhydroxyl compounds, aliphatic aldehydes and aliphatic ketones incorporated in the predeveloper which will not react with iron salts to form insoluble reaction products. In practice, various sugars are satisfactory.

In order to obtain good whites with the ferrocyanide predeveloper, it is necessary to buffer the acid concentration rather carefully. Any of the common acid buffers are satisfactory provided they do not have too powerful oxidizing or reducing properties. In use are mixtures of potassium oxalate, potassium acid oxalate and oxalic acid or mixtures of sodium acid phosphate and oxalic acid.

It will be noted that the catalyst constitutes a small but definite component in the sensitizers disclosed.

Although the specific chemical or chemical-physical mechanism is not understood, it is believed that the action is catalytic. This catalyst may be incorporated with the known type of sensitizing solution as follows:

1. Ethylene diamine nitrate _____ 3.5 g.
2. Citric acid _____ 4 g.
3. Potassium oxalate _____ 6 g.
4. Ferric ammonium oxalate _____ 42 g.
5. Potassium ferricyanide _____ 7 g.
6. Water, to make _____ 250 cc.

This formula is for development in the customary manner involving washing and treatment with an oxidizing agent.

In all cases the inclusion of the catalyst above disclosed improves the speed and the blue color, improves the ease of washing the paper and stabilizes the sensitizing solution against deterioration during storage, as well as stabilizing the paper thus coated against rapid spoiling under normal or adverse atmospheric conditions. It will be understood that we do not contemplate the use of hexamethylene tetramine. This substance is not an aliphatic nitrogen base, and in the appended claims, it may be assumed that hexamethylene tetramine is specifically excluded therefrom.

We claim:
1. The method of making blue prints which consists in coating a paper with a solution comprising a light-reducible ferric complex, a ferricyanide salt and a salt of an aliphatic nitrogen base, then exposing parts of said paper to light and then developing said paper.

2. The method of making blue prints which consists in coating a paper with a solution comprising a light-reducible ferric complex, a ferricyanide salt and a salt of an aliphatic nitrogen base, then exposing parts of said paper to light and then treating said paper in a predeveloper comprising an acid reacting water solution of a ferrocyanide.

3. A coating for blue print paper comprising a light-reducible ferric complex, a ferricyanide salt and a salt of an aliphatic nitrogen base.

CLYDE A. CROWLEY.
GEORGE H. GOODYEAR.